(12) United States Patent
Kim

(10) Patent No.: US 11,164,046 B1
(45) Date of Patent: Nov. 2, 2021

(54) METHOD FOR PRODUCING LABELED IMAGE FROM ORIGINAL IMAGE WHILE PREVENTING PRIVATE INFORMATION LEAKAGE OF ORIGINAL IMAGE AND SERVER USING THE SAME

(71) Applicant: Deeping Source Inc., Seoul (KR)

(72) Inventor: Tae Hoon Kim, Seoul (KR)

(73) Assignee: Deeping Source Inc., Seoul (KR)

( * ) Notice: Subject to any disclaimer, the term of this patent is extended or adjusted under 35 U.S.C. 154(b) by 0 days.

(21) Appl. No.: 17/243,643

(22) Filed: Apr. 29, 2021

(30) Foreign Application Priority Data

Dec. 7, 2020 (KR) ........................ 10-2020-0169977

(51) Int. Cl.
  *G06K 9/62* (2006.01)
  *G06N 3/08* (2006.01)
  *G06F 21/62* (2013.01)

(52) U.S. Cl.
  CPC ....... *G06K 9/6259* (2013.01); *G06F 21/6254* (2013.01); *G06K 9/6203* (2013.01); *G06N 3/08* (2013.01); *G06K 2009/6213* (2013.01)

(58) Field of Classification Search
  CPC .... G06K 9/6203; G06K 9/6259; G06F 21/10; G06F 21/60; G06F 21/6245; G06F 21/6254; H04L 63/0421; H04L 2209/16; G06N 3/08
  See application file for complete search history.

(56) References Cited

U.S. PATENT DOCUMENTS

| 10,395,180 B2 * | 8/2019 | Wang | G06N 20/00 |
| 2020/0043599 A1 * | 2/2020 | Yoon | G16H 30/40 |
| 2020/0175209 A1 * | 6/2020 | Yost | G06F 21/6245 |
| 2021/0064781 A1 * | 3/2021 | Raphael | G06F 21/602 |

OTHER PUBLICATIONS

A computer English Translation of Japanese patent No. JP 2009-93538 A, pp. 1-16. (Year: 2009).*

* cited by examiner

*Primary Examiner* — Daniel G Mariam
(74) *Attorney, Agent, or Firm* — Husch Blackwell LLP

(57) ABSTRACT

A method for producing a labeled image is provided. The method includes steps of: a labeling server (i) providing an image modifying interface to a user device to generate at least one anonymized image by anonymizing the original image except a specific labeling region among at least one labeling region, or generate at least one cropped image by cropping the labeling region, thus generating at least one transformed image by applying at least one transform function to the anonymized image or the cropped image, (ii) acquiring an obfuscated image by obfuscating the original image, (iii) acquiring at least one partial labeled image by allowing labelers to label the transformed image, and (iv) inversely applying the transform function received from the user device to the partial labeled image, thus generating at least one piece of adjusted partial labeling information and combining thereof with the obfuscated image to generate the labeled image.

30 Claims, 10 Drawing Sheets

METHOD FOR PRODUCING LABELED IMAGE FROM ORIGINAL IMAGE WHILE PREVENTING PRIVATE INFORMATION LEAKAGE OF ORIGINAL IMAGE AND SERVER USING THE SAME

CROSS-REFERENCE TO RELATED APPLICATION

This present application claims the benefit of the earlier filing date of Korean provisional patent application No. 10-2020-0169977, filed Dec. 7, 2020, the entire contents of which being incorporated herein by reference.

FIELD OF THE DISCLOSURE

The present disclosure relates to a method for producing at least one labeled image from at least one original image while preventing private information leakage of the original image and a server using the same; and more particularly, to the method for dividing, transforming, and obfuscating the original image in order to perform a distributed labeling, acquiring labeling information from at least one partial labeled image obtained from the distributed labeling, and generating the labeled image by combining the labeling information with an obfuscated image corresponding to the original image, and the server using the same.

BACKGROUND OF THE DISCLOSURE

In order to effectively train a neural network used for analyzing data such as images, texts, and audio, a vast amount of training data is essential. On top of this, accurate labeled training data corresponding to original training data is required to generate more precise loss to be used for optimizing a performance of the neural network.

Accordingly, it has been a common practice to manually label the original training data to produce the labeled training data or to use a labeling network, highly-trained for labeling the original training data.

However, not only is such mechanical labeling performed by the labeling network less accurate compared to manual labeling performed by human labelers, but also requires a lot of resources to improve its accuracy. Therefore, it is anticipated that a considerable amount of time will be required before the mechanical labeling can replace the manual labeling.

On the other hand, for the manual labeling, although the accuracy of the labeling is greatly improved, there is a concern about private information leakage from the original training data. As such, even when many data are available for being used as the training data, it is practically restricted to use such data for producing the labeling data due to the possibility of private information leakage.

As a conventional counter-measure to this, the original training data is partially anonymized by blurring or adding noise to an almost all regions of the original image, i.e., an entire region thereof except labeling regions thereof, such that the human labelers are only able to recognize the labeling regions. By doing so, the risk of private information leakage may be reduced but the labeling regions which are not anonymized can still be misused.

Therefore, as an alternative, FIG. 1 shows a method of anonymizing the original training data to generate a plurality of anonymized data, each including at least one of the labeling regions that are not anonymized. In this method, the anonymized data are distributed among more than one human labelers such that each of the human labelers only performs labeling on given anonymized data.

This may further reduce the risk of private information leakage since it is difficult to expose private information from only part of the labeling regions. However, even this method is not entirely safe since it is still possible to recover the original training data if someone with malicious intent collects the anonymized data and combine them.

Therefore, an enhanced method for solving the aforementioned problems is required.

SUMMARY OF THE DISCLOSURE

It is an object of the present disclosure to solve all the aforementioned problems.

It is another object of the present disclosure to prevent a leakage of private information included in an original image by using transformed images for a distributed labeling, wherein the transformed images are generated by dividing, transforming and obfuscating the original image.

It is still another object of the present disclosure to generate a labeled image corresponding to the original image without having to directly use the original image by using partial labeled images obtained from the distributed labeling, an obfuscated image generated from obfuscating the original image, and transform functions applied to the original image for generating the transformed images.

It is still yet another object of the present disclosure to obfuscate the original image through an obfuscation network to generate the obfuscated image that is not identifiable by naked eyes but identifiable by neural networks, such that the labeled image generated by combining the obfuscated image with labels is not identifiable by naked eyes but usable for training the neural networks.

In accordance with one aspect of the present disclosure, there is provided a method for producing at least one labeled image from at least one original image while preventing private information leakage of the original image, including steps of: (a) a labeling server performing or supporting another device to perform a process of (i) providing an image modifying interface to a user device owned by a user having at least one original image, to thereby allow the user device to (i-1) determine labeling region information through the image modifying interface, wherein the labeling region information includes a 1-st labeling region to an n-th labeling region on which labeling for the original image is to be performed, and (i-2) perform one of (i-2-a) generating a k-th anonymized image by anonymizing an entire region of the original image except a k-th labeling region as k varies from 1 to n, resulting in a generation of a 1-st anonymized image to an n-th anonymized image, and selecting a 1-st transform function to an n-th transform function thus to generate a 1-st transformed image to an n-th transformed image by applying the 1-st transform function to the n-th transform function respectively to the 1-st anonymized image to the n-th anonymized image, and (i-2-b) generating a k-th cropped image by cropping the k-th labeling region from the original image as k varies from 1 to n, resulting in a generation of a 1-st cropped image to an n-th cropped image, and selecting the 1-st transform function to the n-th transform function thus to generate the 1-st transformed image to the n-th transformed image by applying the 1-st transform function to the n-th transform function respectively to the 1-st cropped image to the n-th cropped image, and (ii) providing an obfuscating interface to the user device to thereby allow the user device to generate an obfuscation request for the original image, and then, in response to the obfuscation request, allow an obfuscation network to obfuscate the original image by performing an obfuscating operation on the original image, thus to generate an obfuscated image; (b) the labeling server performing or supporting another device to perform a process of transmitting the 1-st transformed image to the n-th transformed image, having received from the user device, to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the labeling server; and (c) in response to acquiring the 1-st partial labeled image to the n-th partial labeled image, the labeling server performing or supporting another device to perform a process of applying a 1-st inverse transform function to an n-th inverse transform function, respectively corresponding to the 1-st transform function to the n-th transform function received from the user device, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

As one example, at the step of (a), the labeling server performs or supports another device to perform a process of allowing the user device to apply at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus to generate the 1-st transformed image to the n-th transformed image.

As another example, at the step of (c), the labeling server performs or supports another device to perform a process of acquiring an encrypted 1-st transform function to an encrypted n-th transform function from the user device and decrypting the encrypted 1-st transform function to the encrypted n-th transform function, to thereby obtain the 1-st transform function to the n-th transform function and then generate the 1-st inverse transform function to the n-th inverse transform function corresponding to the 1-st transform function to the n-th transform function.

As another example, at the step of (a), the labeling server performs or supports another device to perform a process of allowing the user device to anonymize the entire region of the original image except the k-th labeling region by using at least one anonymizing algorithm, including noise addition, blurring, resolution change, and watermark addition, as k varies from 1 to n, and thus to generate the 1-st anonymized image to the n-th anonymized image.

As another example, at the step of (a), the labeling server performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

As another example, the labeling server performs or supports another device to perform a process of allowing the user device to generate the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

As another example, the obfuscation network has been trained by a learning device, wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

As another example, at the step of (c), the labeling server performs or supports another device to perform a process of transmitting the labeled image to the user device or a third party server or a third party device requiring the labeled image for training neural networks.

In accordance with another aspect of the present disclosure, there is provided a method for producing at least one labeled image from at least one original image while preventing private information leakage of the original image, including steps of: (a) in response to receiving labeling request information for at least one original image from a user device, a labeling server performing or supporting another device to perform a process of (i) (i-1) determining labeling region information by referring to the original image, wherein the labeling region information includes a 1-st labeling region to an n-th labeling region on which labeling for the original image is to be performed, and (i-2) performing one of (i-2-a) generating a k-th anonymized image by anonymizing an entire region of the original image except a k-th labeling region as k varies from 1 to n, resulting in a generation of a 1-st anonymized image to an n-th anonymized image, and applying a 1-st transform function to an n-th transform function respectively to the 1-st anonymized image to the n-th anonymized image, resulting in a generation of a 1-st transformed image to an n-th transformed image, and (i-2-b) generating a k-th cropped image by cropping the k-th labeling region from the original image as k varies from 1 to n, resulting in a generation of a 1-st cropped image to an n-th cropped image, and applying the 1-st transform function to the n-th transform function respectively to the 1-st cropped image to the n-th cropped image, resulting in the generation of the 1-st transformed image to the n-th transformed image, and (ii) inputting the original image into an obfuscation network, to thereby allow the obfuscation network to obfuscate the original image by performing an obfuscating operation on the original image, thus to generate an obfuscate image; (b) the labeling server performing or supporting another device to perform a process of transmitting the 1-st transformed image to the n-th transformed image to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the labeling server; and (c) in response to acquiring the 1-st partial labeled image to the n-th partial labeled image, the labeling server performing or supporting another device to perform a process of applying a 1-st inverse transform function to an n-th inverse transform function, respectively corresponding to the 1-st transform function to the n-th transform function, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

As one example, at the step of (a), the labeling server performs or supports another device to perform a process of applying at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus generating the 1-st transformed image to the n-th transformed image.

As another example, at the step of (a), the labeling server performs or supports another device to perform a process of anonymizing the entire region of the original image except the k-th labeling region by using at least one anonymizing algorithm, including noise addition, blurring, resolution change, and watermark addition, as k varies from 1 to n, and thus generating the 1-st anonymized image to the n-th anonymized image.

As another example, at the step of (a), the labeling server performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

As another example, the labeling server performs or supports another device to perform a process of generating the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

As another example, the obfuscation network has been trained by a learning device, wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

As another example, at the step of (c), the labeling server performs or supports another device to perform a process of transmitting the labeled image to the user device or a third party server or a third party device requiring the labeled image for training neural networks.

In accordance with still another aspect of the present disclosure, there is provided a labeling server for producing at least one labeled image from at least one original image while preventing private information leakage of the original image, including: at least one memory that stores instructions; and at least one processor configured to execute the instructions to perform or support another device to perform: (I) a process of (i) providing an image modifying interface to a user device owned by a user having at least one original image, to thereby allow the user device to (i-1) determine labeling region information through the image modifying interface, wherein the labeling region information includes a 1-st labeling region to an n-th labeling region on which labeling for the original image is to be performed, and (i-2) perform one of (i-2-a) generating a k-th anonymized image by anonymizing an entire region of the original image except a k-th labeling region as k varies from 1 to n, resulting in a generation of a 1-st anonymized image to an n-th anonymized image, and selecting a 1-st transform function to an n-th transform function thus to generate a 1-st transformed image to an n-th transformed image by applying the 1-st transform function to the n-th transform function respectively to the 1-st anonymized image to the n-th anonymized image, and (i-2-b) generating a k-th cropped image by cropping the k-th labeling region from the original image as k varies from 1 to n, resulting in a generation of a 1-st cropped image to an n-th cropped image, and selecting the 1-st transform function to the n-th transform function thus to generate the 1-st transformed image to the n-th transformed image by applying the 1-st transform function to the n-th transform function respectively to the 1-st cropped image to the n-th cropped image, and (ii) providing an obfuscating interface to the user device to thereby allow the user device to generate an obfuscation request for the original image, and then, in response to the obfuscation request, allow an obfuscation network to obfuscate the original image by performing an obfuscating operation on the original image, thus to generate an obfuscated image, (II) a process of transmitting the 1-st transformed image to the n-th transformed image, having received from the user device, to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the processor, and (III) in response to acquiring the 1-st partial labeled image to the n-th partial labeled image, a process of applying a 1-st inverse transform function to an n-th inverse transform function, respectively corresponding to the 1-st transform function to the n-th transform function received from the user device, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

As one example, at the process of (I), the processor performs or supports another device to perform a process of allowing the user device to apply at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus to generate the 1-st transformed image to the n-th transformed image.

As another example, at the process of (III), the processor performs or supports another device to perform a process of acquiring an encrypted 1-st transform function to an encrypted n-th transform function from the user device and decrypting the encrypted 1-st transform function to the encrypted n-th transform function, to thereby obtain the 1-st transform function to the n-th transform function and then generate the 1-st inverse transform function to the n-th inverse transform function corresponding to the 1-st transform function to the n-th transform function.

As another example, at the process of (I), the processor performs or supports another device to perform a process of allowing the user device to anonymize the entire region of the original image except the k-th labeling region by using at least one anonymizing algorithm, including noise addition, blurring, resolution change, and watermark addition, as k varies from 1 to n, and thus to generate the 1-st anonymized image to the n-th anonymized image.

As another example, at the process of (I), the processor performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

As another example, the processor performs or supports another device to perform a process of allowing the user device to generate the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

As another example, the obfuscation network has been trained by a learning device, wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

As another example, at the process of (III), the processor performs or supports another device to perform a process of transmitting the labeled image to the user device or a third party server or a third party device requiring the labeled image for training neural networks.

In accordance with still yet another aspect of the present disclosure, there is provided a labeling server for producing at least one labeled image from at least one original image while preventing private information leakage of the original image, including: at least one memory that stores instructions; and at least one processor configured to execute the instructions to perform or support another device to perform: (I) in response to receiving labeling request information for at least one original image from a user device, a process of (i) (i-1) determining labeling region information by referring to the original image, wherein the labeling region information includes a 1-st labeling region to an n-th labeling region on which labeling for the original image is to be performed, and (i-2) performing one of (i-2-a) generating a k-th anonymized image by anonymizing an entire region of the original image except a k-th labeling region as k varies from 1 to n, resulting in a generation of a 1-st anonymized image to an n-th anonymized image, and applying a 1-st transform function to an n-th transform function respectively to the 1-st anonymized image to the n-th anonymized image, resulting in a generation of a 1-st transformed image to an n-th transformed image, and (i-2-b) generating a k-th cropped image by cropping the k-th labeling region from the original image as k varies from 1 to n, resulting in a generation of a 1-st cropped image to an n-th cropped image, and applying the 1-st transform function to the n-th transform function respectively to the 1-st cropped image to the n-th cropped image, resulting in the generation of the 1-st transformed image to the n-th transformed image, and (ii) inputting the original image into an obfuscation network, to thereby allow the obfuscation network to obfuscate the original image by performing an obfuscating operation on the original image, thus to generate an obfuscate image, (II) a process of transmitting the 1-st transformed image to the n-th transformed image to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the processor, and (III) in response to acquiring the 1-st partial labeled image to the n-th partial labeled image, a process of applying a 1-st inverse transform function to an n-th inverse transform function, respectively corresponding to the 1-st transform function to the n-th transform function, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

As one example, at the process of (I), the processor performs or supports another device to perform a process of applying at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus generating the 1-st transformed image to the n-th transformed image.

As another example, at the process of (I), the processor performs or supports another device to perform a process of anonymizing the entire region of the original image except the k-th labeling region by using at least one anonymizing algorithm, including noise addition, blurring, resolution change, and watermark addition, as k varies from 1 to n, and thus generating the 1-st anonymized image to the n-th anonymized image.

As another example, at the process of (I), the processor performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

As another example, the processor performs or supports another device to perform a process of generating the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

As another example, the obfuscation network has been trained by a learning device, wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

As another example, at the process of (III), the processor performs or supports another device to perform a process of transmitting the labeled image to the user device or a third party server or a third party device requiring the labeled image for training neural networks.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
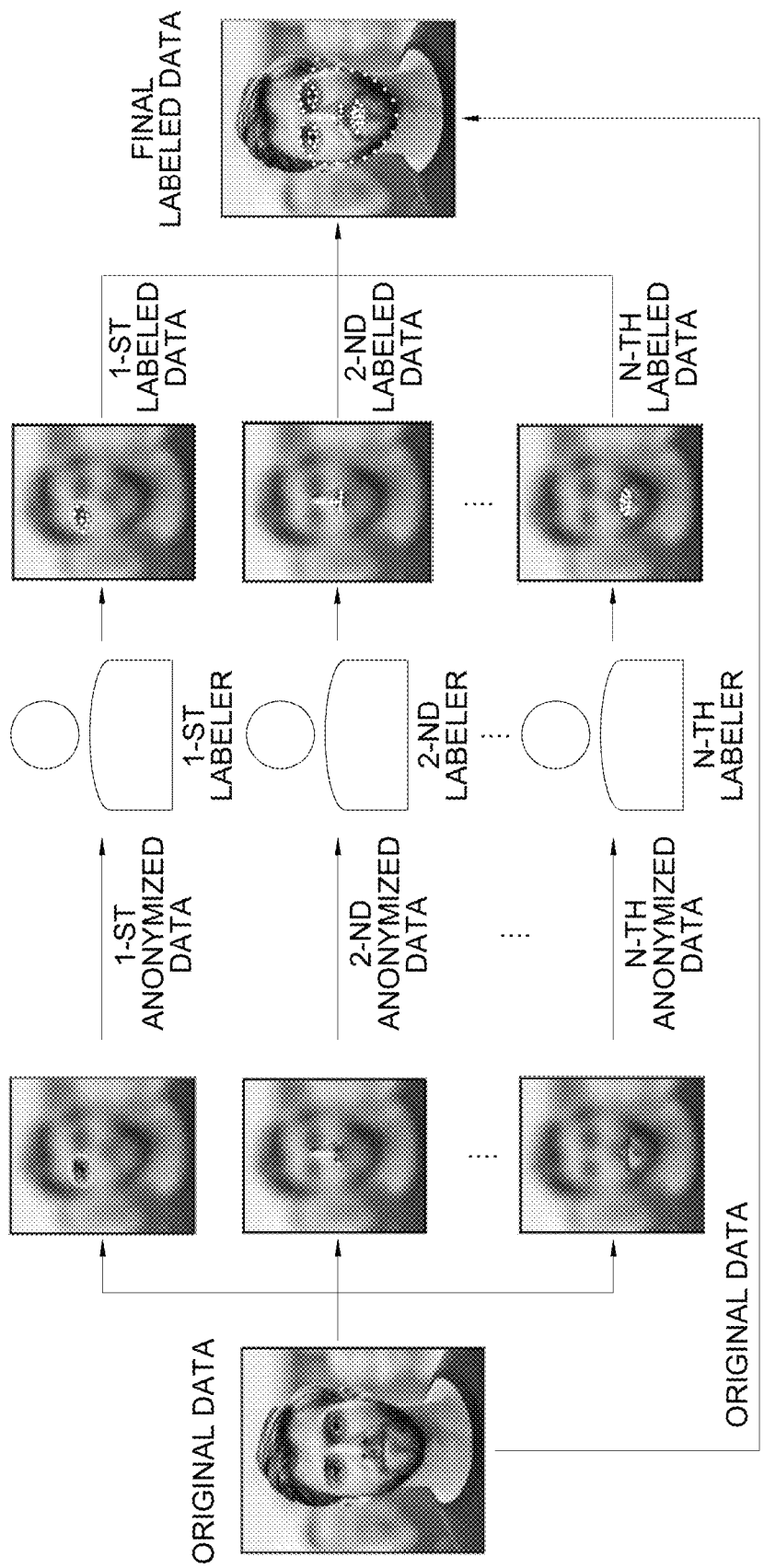
FIG. 1 is a drawing schematically illustrating a conventional example of a distributed labeling.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Figure 2:
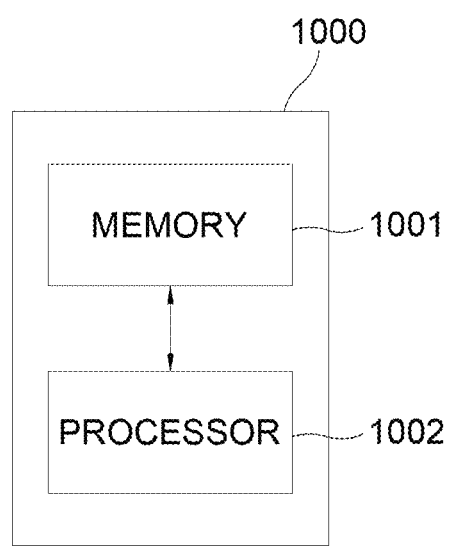
FIG. 2 is a drawing schematically illustrating a labeling server for generating a labeled image corresponding to an original image while preventing private information leakage of the original image in accordance with the present disclosure.

FIG. 2 is a drawing schematically illustrating a labeling server 1000 for generating at least one labeled image corresponding to at least one original image while preventing private information leakage of the original image in accordance with the present disclosure.

By referring to FIG. 1, the labeling server 1000 may include a memory 1001 for storing instructions to generate the labeled image corresponding to the original image while preventing the private information leakage of the original image, and a processor 1002 for generating the labeled image corresponding to the original image while preventing the private information leakage of the original image according to the instructions in the memory 1001.

Specifically, the labeling server 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of generating a labeled image corresponding to an original image while preventing private information leakage of the original image by using the labeling server 1000 configured as explained above is described by referring to FIGS. 3 to 7.

Figure 3:
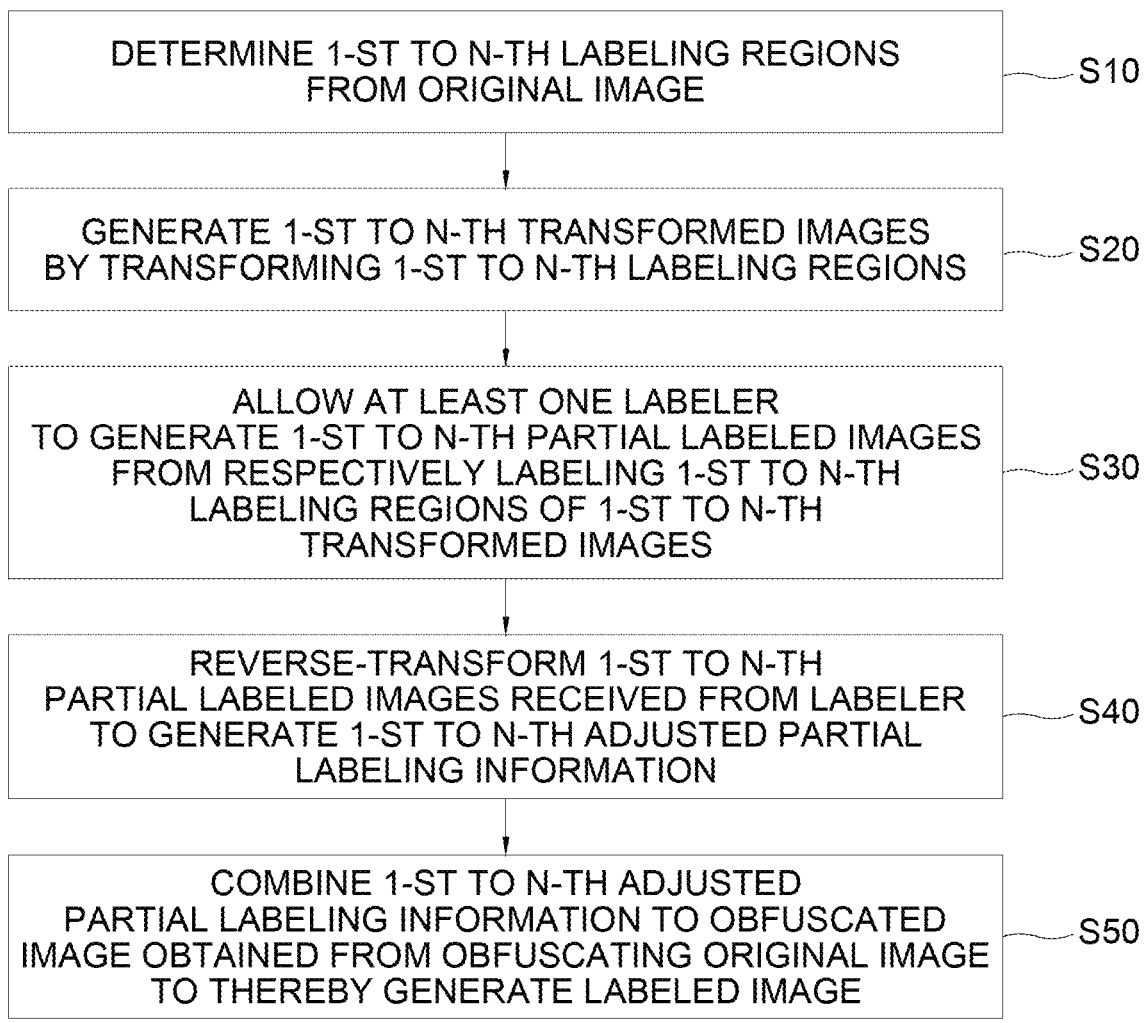
FIG. 3 is a drawing schematically illustrating a process of generating the labeled image corresponding to the original image while preventing the private information leakage of the original image in accordance with the present disclosure.

First, FIG. 3 is schematically illustrating a process of generating the labeled image corresponding to the original image while preventing the private information leakage of the original image in accordance with the present disclosure.

In accordance with the present disclosure as illustrated in FIG. 3, labeling region information may be first determined by referring to the original image at a step of S10, wherein the labeling region information includes a 1-st labeling region to an n-th labeling region on which labeling for the original image is to be performed. Herein, n may be an integer larger than or equal to 1.

For example, the labeling server 1000 providing a labeling service may allow a user owning the original image to determine the 1-st labeling region to the n-th labeling region by referring to the original image, or may perform a deep-learning based analysis on the original image to determine the 1-st labeling region to the n-th labeling region. Herein, in order to acquire the labeling region information, a deep-learning based object detection network, a deep-learning based segmentation network, etc. may be used, but the present disclosure is not limited, and various deep learning networks to classify each region from the original image may be used.

Then, in accordance with the present disclosure, a 1-st transformed image to an n-th transformed image may be generated by respectively transforming the 1-st labeling region to the n-th labeling region from the original image at a step of S20.

For example, the labeling server 1000 may allow the user to generate a k-th anonymized image by anonymizing an entire region of the original image except a k-th labeling region as k varies from 1 to n, resulting in a generation of a 1-st anonymized image to an n-th anonymized image, and select a 1-st transform function to an n-th transform function thus to generate the 1-st transformed image to the n-th transformed image by applying the 1-st transform function to the n-th transform function respectively to the 1-st anonymized image to the n-th anonymized image. Alternatively, instead of letting the user generate the 1-st transformed image to the n-th transformed image, the labeling server 1000 may generate the 1-st transformed image to the n-th transformed image respectively from the 1-st anonymized image to the n-th anonymized image.

Also, instead of generating the 1-st anonymized image to the n-th anonymized image, the labeling server 1000 may allow the user to generate a k-th cropped image by cropping the k-th labeling region from the original image as k varies from 1 to n, resulting in a generation of a 1-st cropped image to an n-th cropped image, and select the 1-st transform function to the n-th transform function such that the 1-st transformed image to the n-th transformed image are generated from applying the 1-st transform function to the n-th transform function respectively to the 1-st cropped image to the n-th cropped image. Alternatively, instead of letting the user generate the 1-st transformed image to the n-th transformed image, the labeling server 1000 may generate the 1-st transformed image to the n-th transformed image respectively from the 1-st cropped image to the n-th cropped image.

Next, the present disclosure may allow at least one labeler to generate a 1-st partial labeled image to an n-th partial labeled image by respectively labeling the 1-st labeling region of the 1-st transformed image to the n-th labeling region of the n-th transformed image at a step of S30.

For example, the labeling server 1000 may transmit the 1-st transformed image to the n-th transformed image to the labeler to thereby allow the label to perform labeling. Herein, a specific labeler who received a specific transformed image among the 1-st transformed image to the n-th transformed image may generate a specific partial labeled image by performing the labeling on a specific labeling region in the specific transformed image without being able to identify the original image from the specific transformed image.

Afterwards, in the present disclosure, 1-st adjusted partial labeling information to n-th adjusted partial labeling information may be generated from reversely transforming the 1-st partial labeled image to the n-th partial labeled image at a step of S40.

For example, in response to acquiring the 1-st partial labeled image to the n-th partial labeled image from the labeler, the labeling server 1000 may apply a 1-st inverse transform function to an n-th inverse transform function, respectively corresponding to the 1-st transform function to the n-th transform function received from the user device, to the 1-st partial labeled image to the n-th partial labeled image, to thereby generate the 1-st adjusted partial labeling information to the n-th adjusted partial labeling information.

Subsequently, the labeled image may be generated by combining at least part of the 1-st adjusted partial labeling information to the n-th adjusted partial labeling information with an obfuscated image at a step of S50, wherein the obfuscated image is generated from obfuscating the original image.

For example, the labeling server 1000 may receive the 1-st transformed image to the n-th transformed image from the labeler. In addition, the labeling server 1000 may generate the obfuscated image by obfuscating the original image or receive the obfuscated image from the user. Herein, the obfuscated image, generated by an obfuscation network, is unidentifiable by naked eyes, but is recognized to be the same as or similar to the original image by the obfuscation network. As such, the labeling server 1000 may combine at least part of the 1-st adjusted partial labeling information to the n-th adjusted partial labeling information with the obfuscated image to generate the labeled image.

The labeled image generated as explained above is unidentifiable by the naked eyes, but still usable for training neural networks. This ensures that private information of the original image is protected from a third party who receives the labeled image to be used for training the neural networks.

A detailed method of generating the labeled image from the original image in accordance with one example embodiment of the present disclosure through interaction between the labeling server 1000 and a user device while preventing the private information leakage of the labeled image is further described below.

Figure 4:
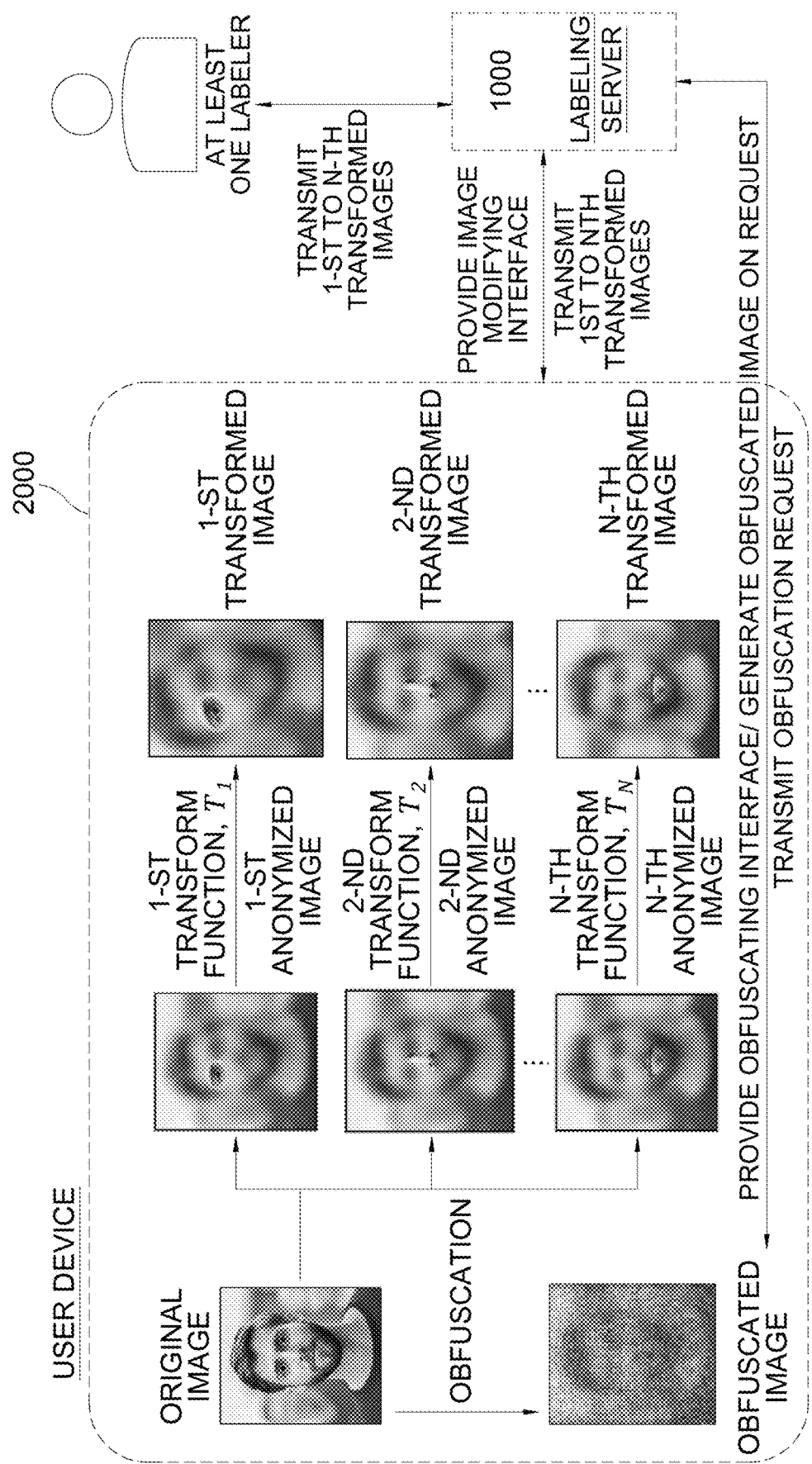
FIG. 4 is a drawing schematically illustrating a method for modifying the original image to prevent the private information leakage the original image during a distributed labeling in accordance with one example embodiment of the present disclosure.
Figure 5:
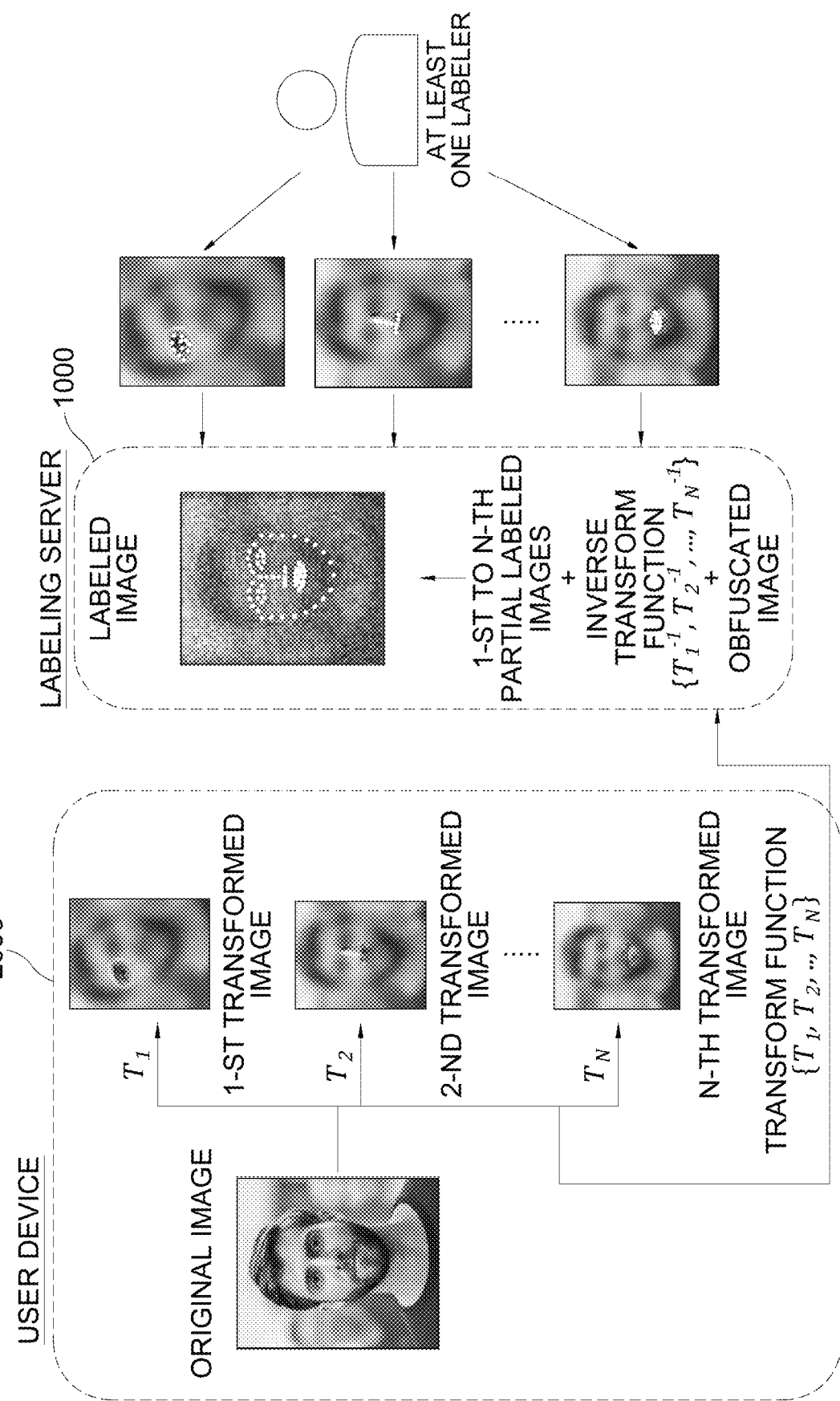
FIG. 5 is a drawing schematically illustrating a method for generating a labeled image in accordance with one example embodiment of the present disclosure.

FIGS. 4 and 5 are schematically illustrating a process of performing the labeling of the original image requested by the user without requiring the labeling server 1000 to store the original image in accordance with one example embodiment of the present disclosure. First, FIG. 4 is a drawing schematically illustrating a method for modifying the original image to prevent the private information leakage the original image during a distributed labeling in accordance with one example embodiment of the present disclosure.

By referring to FIG. 4, the labeling server 1000 may provide an image modifying interface to the user device 2000 owned by the user having at least one original image, to thereby allow the user to determine the labeling region information through the image modifying interface, wherein the labeling region information includes the 1-st labeling region to the n-th labeling region on which the labeling for the original image is to be performed. Herein, at least one action carried out by the user may be executed through or assisted by the user device 2000.

Herein, the user may use a labeling region selection tool provided by the image modifying interface to select the 1-st labeling region to the n-th labeling region, or allow the 1-st labeling region to the n-th labeling region to be automatically selected by a labeling region selection application provided by the image modifying interface. Meanwhile, the labeling region selection application may include the deep-learning based object detection network, the deep-learning based segmentation network, etc. which performs the deep-learning based analysis on the original image to determine the 1-st labeling region to the n-th labeling region. Especially, the deep-learning based object detection network may include a partial object detector capable of detecting partial bodies included within an object on the original image. Also, the labeling region selection application may be included in the labeling server 1000 and made available to the user through the image modifying interface, or be included in the user device 2000 and linked to the image modifying interface to perform an action of selecting labeling regions.

For example, when the user owning the original image transmits labeling request information through the user device 2000, the labeling server 1000 may provide the image modifying interface to the user device 2000 to thereby allow the user to perform image modification on the original image by using the image modifying interface on the user device 2000. That is, in accordance with one example embodiment of the present disclosure, the labeling server 1000 which does not have direct information on the original image may assist the user through the image modifying interface to perform the image modification without requiring the user to transmit the original image to the labeling server 1000. Herein, the labeling server 1000 may be linked to the image modifying interface of the user device 2000 such that the labeling server 1000 may remotely provide instructions for performing the image modification upon receiving requests from the user device 2000 through the image modifying interface. Also, the user device 2000 may be an imaging device, such as a camera, a phone, a CCTV (closed-circuit television), etc., or a device on which such imaging device is installed, such as a computer, a remote-control device, a robot, an autonomous-driving device, etc. However, the present disclosure is not limited thereto, and the user device 2000 may also receive at least one original image from at least one data providers.

Next, the labeling server 1000 may allow the user to generate the k-th anonymized image by using the image modifying interface to anonymize the entire region of the original image except the k-th labeling region as k varies from 1 to n, resulting in the generation of the 1-st anonymized image to the n-th anonymized image.

For example, the user may use an anonymizing tool provided by the image modifying interface to generate the 1-st anonymized image by anonymizing the entire region of the original image except the 1-st labeling region, generate a 2-nd anonymized image by anonymizing the entire region of the original image except the 2-nd labeling region, and so on. Herein, the entire region of the original image except the k-th labeling region may be anonymized by using at least one anonymizing algorithm, including noise addition, blurring, resolution change, and watermark addition, as k varies from 1 to n, and thus to generate the 1-st anonymized image to the n-th anonymized image. Also, each of the 1-st anonymized image to the n-th anonymized image may be generated by applying a plurality of anonymizing algorithms different from one another or applying a single anonymizing algorithm.

Additionally, while it is possible for the user to generate each of the 1-st anonymized image to the n-th anonymized image by selecting the anonymizing algorithm through the image modifying interface, it is also possible for the labeling server 1000 to let the 1-st anonymized image to the n-th anonymized image be automatically generated through the image modifying interface by using the anonymizing algorithm selected by the user. Herein, if more than one anonymizing algorithms are selected by the user, the labeling server 1000 may let the anonymizing algorithms be randomly selected and applied, to thereby generate each of the 1-st anonymized image to the n-th anonymized image.

Also, the user is the one who selected the anonymizing algorithm through the image modifying interface in the explanation above, but it is also possible for the user to transmit an anonymization request for the original image through the image modifying interface such that the labeling server 1000 may apply at least one predetermined anonymizing algorithm to generate the 1-st anonymized image to the n-th anonymized image.

Afterwards, the labeling server 1000 may allow the user to select the 1-st transform function to the n-th transform function such that the 1-st transformed image to the n-th transformed image are generated from applying the 1-st transform function to the n-th transform function, selected by the user through the image modifying interface, respectively to the 1-st anonymized image to the n-th anonymized image.

For example, the user may select the 1-st transform function $T_1$ to the n-th transform function $T_n$ among at least one transform function provided by the image modifying interface. Herein, the transform function may be at least one transformation algorithm, including shape transformation, color change, lateral inversion, position shift, size change, and angle adjustment, and the 1-st transform function $T_1$ to the n-th transform function $T_n$ may be the same with one another or different from one another. Also, the user may let the 1-st transform function to the n-th transform function selected through the image modifying interface be respectively applied to the 1-st anonymized image to the n-th anonymized image, to thereby generate the 1-st transformed image to the n-th transformed image.

Herein, without knowing information on the 1-st transform function $T_1$ to the n-th transform function $T_n$ it may be difficult to recover the original image by simply combining the 1-st labeling region to the n-th labeling region obtained respectively from the 1-st transformed image to the n-th transformed image. As a result, the private information of the original image may not exposed to third parties.

Meanwhile, instead of generating the 1-st transformed image to the n-th transformed image by respectively applying the 1-st transform function to the n-th transform function to the 1-st anonymized image to the n-th anonymized image, the 1-st transformed image to the n-th transformed image may alternatively be generated by applying the 1-st transform function to the n-th transform function to the 1-st cropped image to the n-th cropped image. Herein, the k-th cropped image may be generated by cropping the k-th labeling region from the original image as k varies from 1 to n, resulting in the generation of the 1-st cropped image to the n-th cropped image, and then the 1-st transformed image to the n-th transformed image may be generated by applying the 1-st transform function to the n-th transform function respectively to the 1-st cropped image to the n-th cropped image.

In other words, the labeling server 1000 may allow the user to use a cropping tool provided by the image modifying interface to generate the 1-st cropped image to the n-th cropped image by respectively cropping the 1-st labeling region to the n-th labeling region from the original image. Also, the labeling server 1000 may allow the user to select the 1-st transform function $T_1$ to the n-th transform function $T_n$, such that the 1-st transform function $T_1$ to the n-th transform function $T_n$ selected by the user through the image modifying interface is respectively applied to the 1-st cropped image to the n-th cropped image to thereby generate the 1-st transformed image to the n-th transformed image.

Also, the labeling server 1000 may allow the user to modify the original image to generate the 1-st transformed image to the n-th transformed image by selecting and using the anonymizing algorithm, the transform function, the crop tool, etc. provided by the image modifying interface, but the present disclosure is not limited thereto. As such, the present disclosure may also include a case where the labeling server 1000 may select relevant tools, i.e., the anonymizing algorithm, the transform function, the crop tool, etc., for the user in response to receiving the requests made through the image modifying interface to thereby generate the 1-st transformed image to the n-th transformed image. Herein, the anonymizing algorithm, the transformation function, the crop tool, etc. may be made available in the labeling server 1000 or the user device 2000.

Next, in response to receiving the 1-st transformed image to the n-th transformed image from the user device 2000, the labeling server 1000 may transmit the 1-st transformed image to the n-th transformed image to at least one labeler.

Then, the labeler may generate the 1-st partial labeled image to the n-th partial labeled image by respectively labeling the 1-st labeling region of the 1-st transformed image to the n-th labeling region of the n-th transformed image, and then transmit the 1-st partial labeled image to the n-th partial labeled image to the labeling server 1000.

Meanwhile, the labeling server 1000 may provide an obfuscating interface to the user device 2000 to thereby allow the user device 2000 to generate an obfuscation request for the original image, and then in response to receiving the obfuscation request, may allow the obfuscation network to obfuscate the original image by performing an obfuscating operation on the original image, thus to generate the obfuscated image. Herein, the obfuscated image generated by the obfuscation network is unidentifiable to the naked eyes but identifiable to the neural networks. For example, the labeling server 1000 may allow the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image. However, the present disclosure is not limited thereto, and concealing networks of various structures may be used to obfuscate the original image.

Also, the obfuscation network may have been trained to generate at least one obfuscated training image by obfuscating at least one training image, and wherein the obfuscated training image is unidentifiable by the naked eyes but is recognized to be the same as or similar to the training image by a trained surrogate network.

In the present disclosure, the 1-st to the n-th anonymized image is generated by using the anonymizing algorithm, such as the noise addition, the blurring, the resolution change, and the watermark addition, etc., with a primary purpose of preventing the private information of the original image from being exposed to the labeler. On the other hand, obfuscating operation on the original image carried out by the obfuscation network ensures that the original image is not retrievable from the obfuscated image but at the same time the obfuscated image is still recognized by the trained surrogate network. In order to achieve such effects, the obfuscation network has to be trained by using the trained surrogate network in advance of using the obfuscation network to produce the obfuscated image. As such, training methods for the obfuscation network are described at the end of the detailed description of the present disclosure.

Next, the labeling server 1000 may generate the labeled image by using the information on the 1-st transform function to the n-th transform function received from the user device 2000, the 1-st partial labeled image to the n-th partial labeled image received from the labeler and the obfuscated image which may be stored in the labeling server 1000.

In detail, FIG. 5 is schematically illustrating a method for generating the labeled image by applying the 1-st inverse transform function to the n-th inverse transform function to the 1-st partial labeled image to the n-th partial labeled image to generate the 1-st adjusted partial labeling information to the n-th adjusted partial labeling information and then combining the 1-st adjusted partial labeling information to the n-th adjusted partial labeling information with the obfuscated image in accordance with one example embodiment of the present disclosure.

By referring to FIG. 5, in response to acquiring the 1-st partial labeled image to the n-th partial labeled image, the labeling server 1000 may apply the 1-st inverse transform function $T_1^{-1}$ to the n-th inverse transform function $T_n^{-1}$ respectively corresponding to the 1-st transform function $T_1$ to the n-th transform function $T_n$ received from the user device 2000, to the 1-st partial labeled image to the n-th partial labeled image, to thereby generate the 1-st adjusted partial labeling information to the n-th adjusted partial labeling information.

Herein, the labeling server 1000 may acquire an encrypted 1-st transform function to an encrypted n-th transform function from the user device 2000 and decrypt the encrypted 1-st transform function to the encrypted n-th transform function, to thereby obtain the 1-st transform function $T_1$ to the n-th transform function $T_n$ and then generate the 1-st inverse transform function $T_1^{-1}$ to the n-th inverse transform function $T_n^{-1}$ corresponding to the 1-st transform function $T_1$ to the n-th transform function $T_n$.

Unlike this, it may also be possible for the labeling server 1000 to acquire the information on the 1-st transform function $T_1$ to the n-th transform function $T_n$ by checking the 1-st transform function $T_1$ to the n-th transform function $T_n$ provided through the image modifying interface in response to the requests made by the user.

Following, the labeling server 1000 may generate the labeled image corresponding to the original image by combining at least part of the 1-st adjusted partial labeling information to the n-th adjusted partial labeling information with the obfuscated image. That is, the labeling server 1000 may be linked to a browser or multiple user devices and receive necessary information related to the 1-st transform function $T_1$ to the n-th transform function $T_n$ to thereby generate the labeled image without directly using the original image.

Herein, it may be difficult to infer the original image from the labeled image with the naked eyes, but features or losses relevant for training the neural networks may still be extractable from the labeled image. Therefore, the labeling server 1000 may transmit the labeled image to the user device 2000 or a third party server or a third party device requiring the labeled image for training the neural networks.

Figure 6:
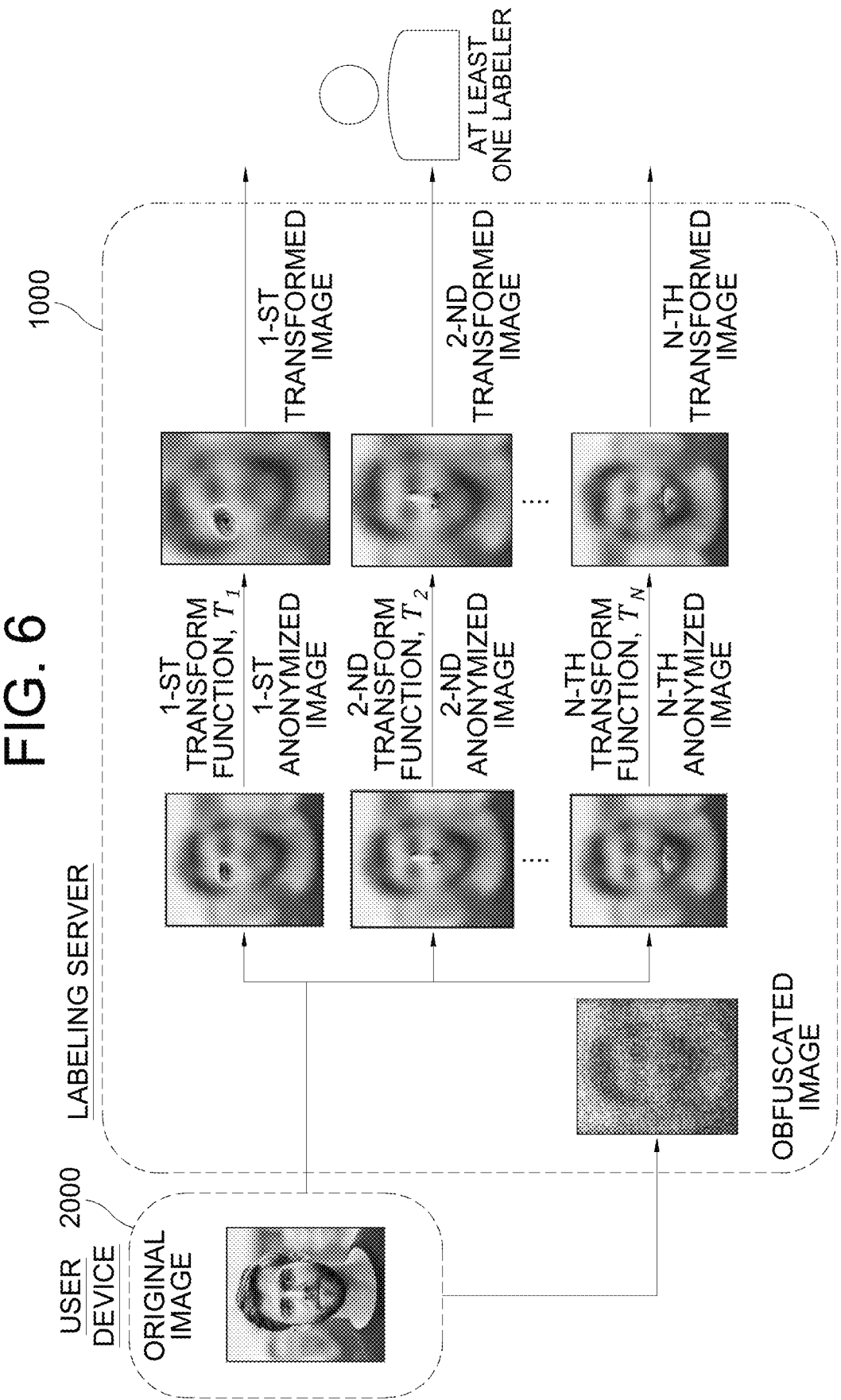
FIG. 6 is a drawing schematically illustrating a method for modifying the original image to prevent the private information leakage of the original image during the distributed labeling in accordance with another example embodiment of the present disclosure.
Figure 7:
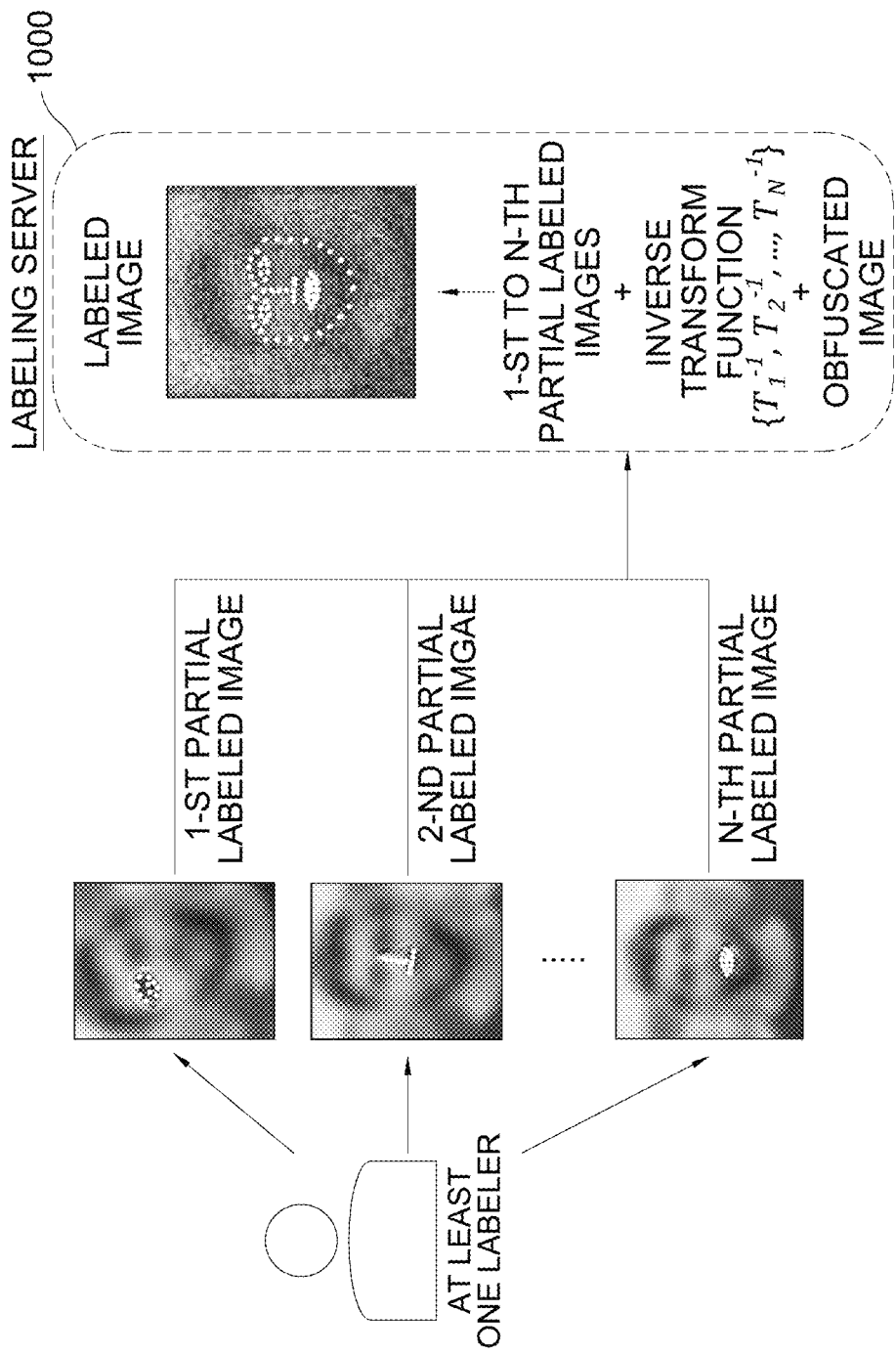
FIG. 7 is a drawing schematically illustrating a method for generating the labeled image in accordance with another example embodiment of the present disclosure.

FIGS. 6 and 7 are schematically illustrating a method of generating the labeled image from the original image while preventing the private information leakage of the original image in accordance with another example embodiment of the present disclosure. In accordance with said another example embodiment of the present disclosure, the labeling server 1000 may receive the original image requested for labeling and generate the labeled image thereof.

First, FIG. 6 is a drawing schematically illustrating a method of for modifying the original image to prevent the private information leakage of the original image during the distributed labeling in accordance with another example embodiment of the present disclosure. In the following description, detailed explanation of parts that can be easily understood from the description provided by referring to FIGS. 4 and 5 are omitted.

By referring to FIG. 6, in response to receiving the labeling request information for at least one original image from the user device 2000, the labeling server 1000 may determine the labeling region information by referring to the original image, wherein the labeling region information includes the 1-st labeling region to the n-th labeling region on which the labeling for the original image is to be performed.

For example, the user owning the original image may transmit the labeling request information through the user device 2000 to the labeling server 1000. Herein, the user device 2000 may be the imaging device, such as a camera, a phone, a CCTV (closed-circuit television), etc., or the device on which such imaging device is installed, such as a computer, a remote-control device, a robot, an autonomous-driving device, etc. However, the present disclosure is not limited thereto and the user device 2000 may include any computing device which acquires the original image first-hand or indirectly obtains the original image acquired by a specific device.

Herein, in response to receiving the labeling request information from the user device 2000, the labeling server may use the deep-learning based object detection network, the deep-learning based segmentation network, etc. to perform the deep-learning based analysis on the original image to determine the 1-st labeling region to the n-th labeling region. However, the present disclosure is not limited thereto and the labeling server 1000 may use various deep learning networks to classify each region from the original image. Especially, the deep-learning based object detection network may include the partial object detector capable of detecting partial bodies included within an object on the original image.

Subsequently, the labeling server 1000 may generate the k-th anonymized image by anonymizing the entire region of the original image except the k-th labeling region as k varies from 1 to n, resulting in the generation of the 1-st anonymized image to the n-th anonymized image.

Herein, the labeling server 1000 may generate the 1-st anonymized image by anonymizing the entire region of the original image except the 1-st labeling region, generate the 2-nd anonymized image by anonymizing the entire region of the original image except the 2-nd labeling region, and so on. Herein, the entire region of the original image except the k-th labeling region may be anonymized by using at least one anonymizing algorithm, including noise addition, blurring, resolution change, and watermark addition, as k varies from 1 to n, and thus to generate the 1-st anonymized image to the n-th anonymized image. Also, each of the 1-st anonymized image to the n-th anonymized image may be generated by applying a plurality of anonymizing algorithms different from one another or applying a single anonymizing algorithm.

Then, the labeling server 1000 may apply the 1-st transform function $T_1$ to the n-th transform function $T_n$ respectively to the 1-st anonymized image to the n-th anonymized image, resulting in the generation of the 1-st transformed image to the n-th transformed image. Herein, the transform function may be at least one transformation algorithm, including shape transformation, color change, lateral inversion, position shift, size change, and angle adjustment, and the 1-st transform function $T_1$ to the n-th transform function $T_n$ may be the same with one another or different from one another. Herein, without knowing information on the 1-st transform function $T_1$ to the n-th transform function $T_n$ it may be difficult to recover the original image by simply combining the 1-st labeling region to the n-th labeling region obtained respectively from the 1-st transformed image to the n-th transformed image. As a result, the private information of the original image may not exposed to third parties.

Meanwhile, instead of generating the 1-st transformed image to the n-th transformed image by respectively applying the 1-st transform function to the n-th transform function to the 1-st anonymized image to the n-th anonymized image, the 1-st transformed image to the n-th transformed image may alternatively be generated by applying the 1-st transform function to the n-th transform function to the 1-st cropped image to the n-th cropped image. Herein, the k-th cropped image may be generated by cropping the k-th labeling region from the original image as k varies from 1 to n, resulting in the generation of the 1-st cropped image to the n-th cropped image, and then the 1-st transformed image to the n-th transformed image may be generated by applying the 1-st transform function to the n-th transform function respectively to the 1-st cropped image to the n-th cropped image.

Next, the labeling server 1000 may transmit the 1-st transformed image to the n-th transformed image to at least one labeler. Then, the labeler may generate the 1-st partial labeled image to the n-th partial labeled image by respectively labeling the 1-st labeling region of the 1-st transformed image to the n-th labeling region of the n-th transformed image, and then transmit the 1-st partial labeled image to the n-th partial labeled image to the labeling server 1000.

Meanwhile, the labeling server 1000 may input the original image into the obfuscation network, to thereby allow the obfuscation network to obfuscate the original image by performing the obfuscating operation on the original image, thus to generate the obfuscate image. Herein, the obfuscated image generated by the obfuscation network is unidentifiable to the naked eyes but identifiable to the neural networks. For example, the labeling server 1000 may allow the obfuscation network to input the original image into the encoder including a plurality of the convolutional layers to thereby generate the feature map corresponding to the original image, and then to input the feature map into the decoder including a plurality of the deconvolutional layers to thereby generate the obfuscated image corresponding to the original image. However, the present disclosure is not limited thereto, and the concealing networks of various structures may be used to obfuscate the original image.

Also, the obfuscation network may have been trained to generate at least one obfuscated training image by obfuscating at least one training image, and wherein the obfuscated training image is unidentifiable by the naked eyes but is recognized to be the same as or similar to the training image by the trained surrogate network. Training methods for the obfuscation network are described at the end of the detailed description of the present disclosure.

Next, the labeling server 1000 may generate the labeled image by using the information on the 1-st transform function to the n-th transform function, the obfuscated image, and the 1-st partial labeled image to the n-th partial labeled image received from the labeler. In detail, FIG. 7 is schematically illustrating a method for generating the labeled image by applying the 1-st inverse transform function to the n-th inverse transform function to the 1-st partial labeled image to the n-th partial labeled image and combining thereof with the obfuscated image in accordance with another example embodiment of the present disclosure.

By referring to FIG. 7, in response to acquiring the 1-st partial labeled image to the n-th partial labeled image, the labeling server 1000 may apply the 1-st inverse transform function $T_1^{-1}$ to the n-th inverse transform function $T_n^{-1}$ respectively corresponding to the 1-st transform function $T_1$ to the n-th transform function $T_n$ to the 1-st partial labeled image to the n-th partial labeled image, to thereby generate the 1-st adjusted partial labeling information to the n-th adjusted partial labeling information.

Following, the labeling server 1000 may generate the labeled image corresponding to the original image by combining at least part of the 1-st adjusted partial labeling information to the n-th adjusted partial labeling information with the obfuscated image. Herein, it may be difficult to infer the original image from the labeled image with the naked eyes, but features or losses relevant for training the neural networks may still be extractable from the labeled image. Therefore, the labeling server 1000 may transmit the labeled image to the user device 2000 or a third party server or a third party device requiring the labeled image for training the neural networks.

Figure 8:
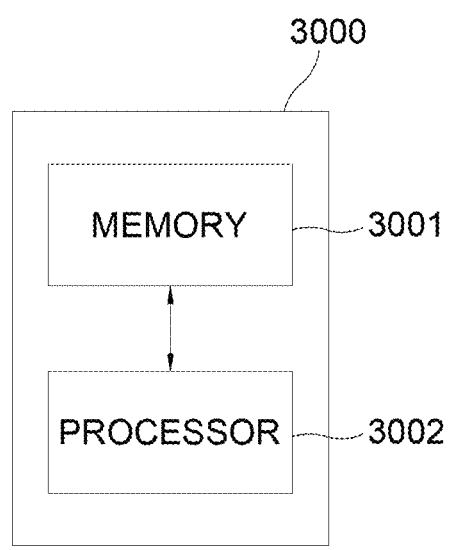
FIG. 8 is a drawing schematically illustrating a learning device for training an obfuscation network capable of generating an obfuscated image from the original image in accordance with the present disclosure.

Meanwhile, FIG. 8 is a drawing schematically illustrating a learning device 3000 for training the obfuscation network capable of generating the obfuscated image from the original image in accordance with the present disclosure.

By referring to FIG. 8, the learning device 3000 may include a memory 3001 for storing instructions to train the obfuscation network, and a processor 3002 for training the obfuscation network according to the instructions in the memory 3001.

Specifically, the learning device 3000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Methods for training the obfuscation network by using the learning device 3000 configured as explained above is described by referring to FIGS. 9 and 10.

Figure 9:
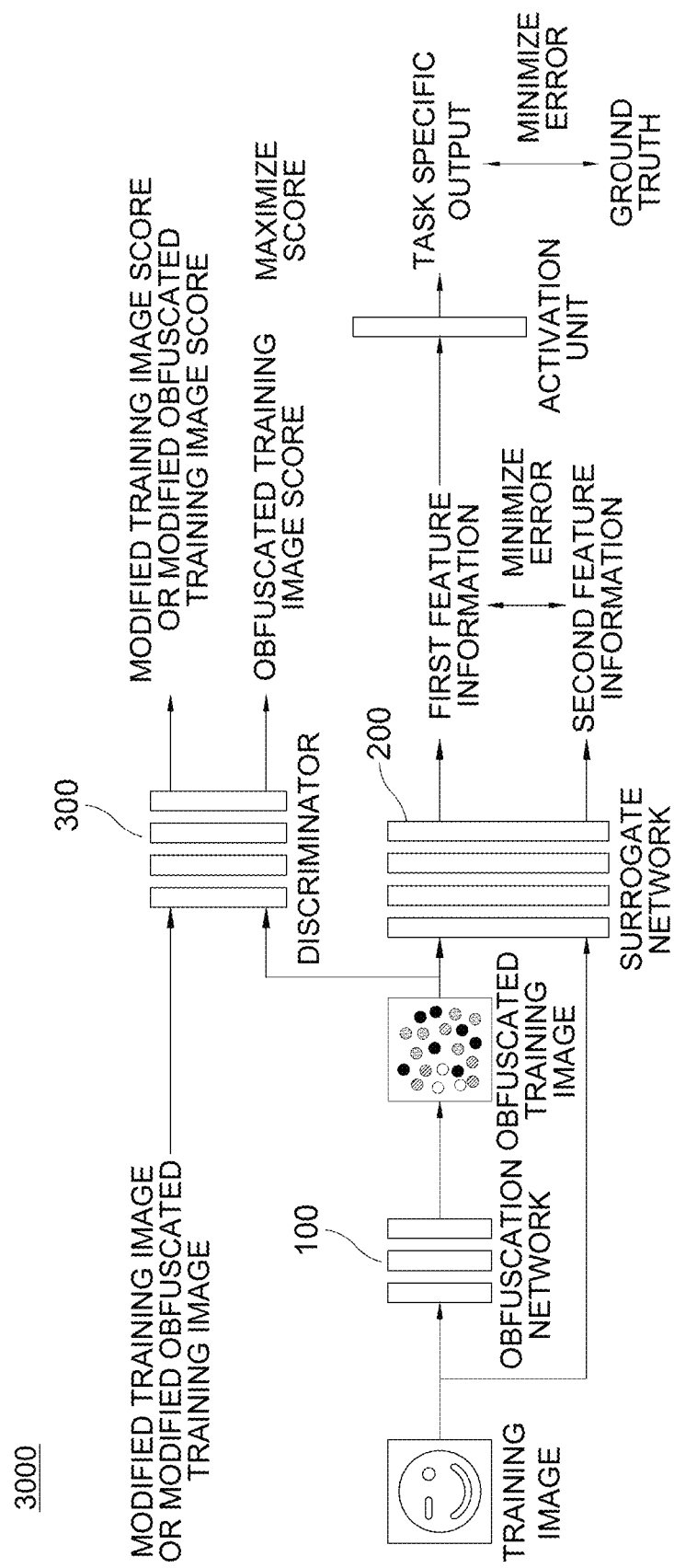
FIG. 9 is a drawing schematically illustrating a method for training the obfuscation network with one example embodiment of the present disclosure.

First, by referring to FIG. 9, the learning device 3000 may (i) input the training image into the obfuscation network 100, to thereby allow the obfuscation network 100 to obfuscate the training image and thus to generate the obfuscated training image, (ii) input the obfuscated training image and the training image into the trained surrogate network 200 to allow the trained surrogate network 200 to perform a learning operation respectively on the obfuscated training image and the training image and thus to generate a first feature information corresponding to the obfuscated training image and a second feature information corresponding to the training image, and (iii) (iii-1) acquire a first error by referring to the first feature information and the second feature information or by referring to a task specific output and its corresponding ground truth, wherein the task specific output is generated by using the first feature information, and thus train the obfuscation network 100 to minimize the first error, and (iii-2) acquire a second error by referring to the training image and the obfuscated training image, and thus train the obfuscation network 100 to maximize the second error. Herein, the obfuscated training image is unidentifiable by the naked eyes but is recognized to be the same as or similar to the training image by the trained surrogate network 200. Also, the trained surrogate network 200 capable of generating features or logits corresponding to the obfuscated training image may be a surrogate network which has been pre-trained with original data and obfuscated data in order to predict analysis results yielded by the neural networks to be trained with the obfuscated image generated from the obfuscation network 100.

Herein, the trained surrogate network 200 may include a machine learning network, but the scope of the present disclosure is not limited thereto, and may include any learning networks capable of, using their own learned parameters, generating the first feature information by applying the learning operation to the obfuscated training image, and generating the second feature information by applying the learning operation to the training image. In addition, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

Additionally, the first feature information and the second feature information may be features or logits respectively corresponding to the obfuscated training image and the training image. Also, the first feature information and the second feature information may be feature values related to certain features respectively in the obfuscated training image and the training image, or the logits including values related to at least one of vectors, matrices, and coordinates related to the certain features. For example, if the training image is a facial image, the result above may be classes for face recognition, facial features, e.g., laughing expressions, coordinates of facial landmark points, e.g., both end points on far sides of an eye.

Therefore, the learning device 3000 may train the obfuscation network 100 such that (i) the first error is minimized which is calculated by referring to at least part of (i-1) at least one (1_1)-st error acquired by referring to the first feature information and the second feature information, and (i-2) at least one (1_2)-nd error acquired by referring to the task specific output generated by using the first feature information and by further referring to the ground truth corresponding to the task specific output, and such that (ii) the second error is maximized which is calculated by referring to the training image and the obfuscated training image. That is, the learning device 3000 may train the obfuscation network 100, such that the obfuscation network 100 outputs the obfuscated training image much different from the training image by using the second error, and such that the obfuscation network 100 obfuscates the training image by using the first error, in order for the trained surrogate network 200 to recognize the obfuscated training image as same or similar to the training image, to thereby output the obfuscated training image. Also, as one example, the learning device 3000 may acquire the first error by referring to a norm or a cosine similarity between the first feature information and the second feature information, but the scope of the present disclosure is not limited thereto, and any various algorithms capable of calculating difference between the first feature information and the second feature information may be used.

In addition, the learning device 3000 may measure at least one quality by referring to at least part of an entropy and a degree of noise of the obfuscated training image, and may acquire the first error by further referring to the quality. That is, the learning device 3000 may train the obfuscation network 100, such that quality of the obfuscated training image is minimized, for example, such that the entropy, noise, etc. of the obfuscated training image is maximized.

And, if the learning device 3000 trains the obfuscation network 100 such that the first error is minimized and that the second error is maximized, then the learning device 3000 may fix and not update the learned parameters of the trained surrogate network 200, and may proceed with training the obfuscation network 100 only.

Meanwhile, the task specific output may be an output of a task to be performed by the trained surrogate network 200, and may have various results according to the task learned by the trained surrogate network 200, such as a probability of a class for classification, coordinates resulting from regression for location detection, etc., and an activation function of an activation unit may be applied to feature information outputted from the trained surrogate network 200, to thereby generate the task specific output according to the task to be performed by the trained surrogate network 200. Herein, the activation function may include a sigmoid function, a linear function, a softmax function, an rlinear function, a square function, a sqrt function, an srlinear function, an abs function, a tanh function, a brlinear function, etc. but the scope of the present disclosure is not limited thereto.

As one example, when the trained surrogate network 200 performs the task for the classification, the learning device 3000 may map the first feature information outputted from the trained surrogate network 200 onto each of classes, to thereby generate one or more probabilities of the obfuscated training image, for each of the classes.

Herein, the probabilities for each of the classes may represent probabilities of the first feature information, outputted for each of the classes from the trained surrogate network 200, being correct. For example, if the training image is the facial image, a probability of the face having a laughing expression may be outputted as 0.75, and a probability of the face not having the laughing expression may be outputted as 0.25, and the like. Herein, a softmax algorithm may be used for mapping the first feature information outputted from the trained surrogate network 200 onto each of the classes, but the scope of the present disclosure is not limited thereto, and various algorithms may be used for mapping the first feature information onto each of the classes.

Further, on condition that at least one obfuscated training image score has been acquired as the second error which corresponds to the obfuscated training image inputted into a discriminator 300 for determining whether inputted data is real or fake, the learning device 3000 may (i) train the obfuscation network 100 such that the first error is minimized and such that the second error is maximized, and (ii) train the discriminator 300 such that at least one modified training image score or at least one modified obfuscated training image score corresponding to the modified training image or the modified obfuscated training image inputted into the discriminator 300 is maximized and that the obfuscated training image score is minimized. Herein, the training image may be an original training image to be used for training or the modified training image generated by modifying the original training image. Herein, the modified training image is recognized to be different from the training image by the naked eyes, but is recognized to be the same as or similar to the training image by the trained surrogate network 200. Also, the modified training image or the modified obfuscated training image may be respectively generated by adding at least one random noise created through a random noise generating network (not illustrated) to the training image or the obfuscated training image.

Figure 10:
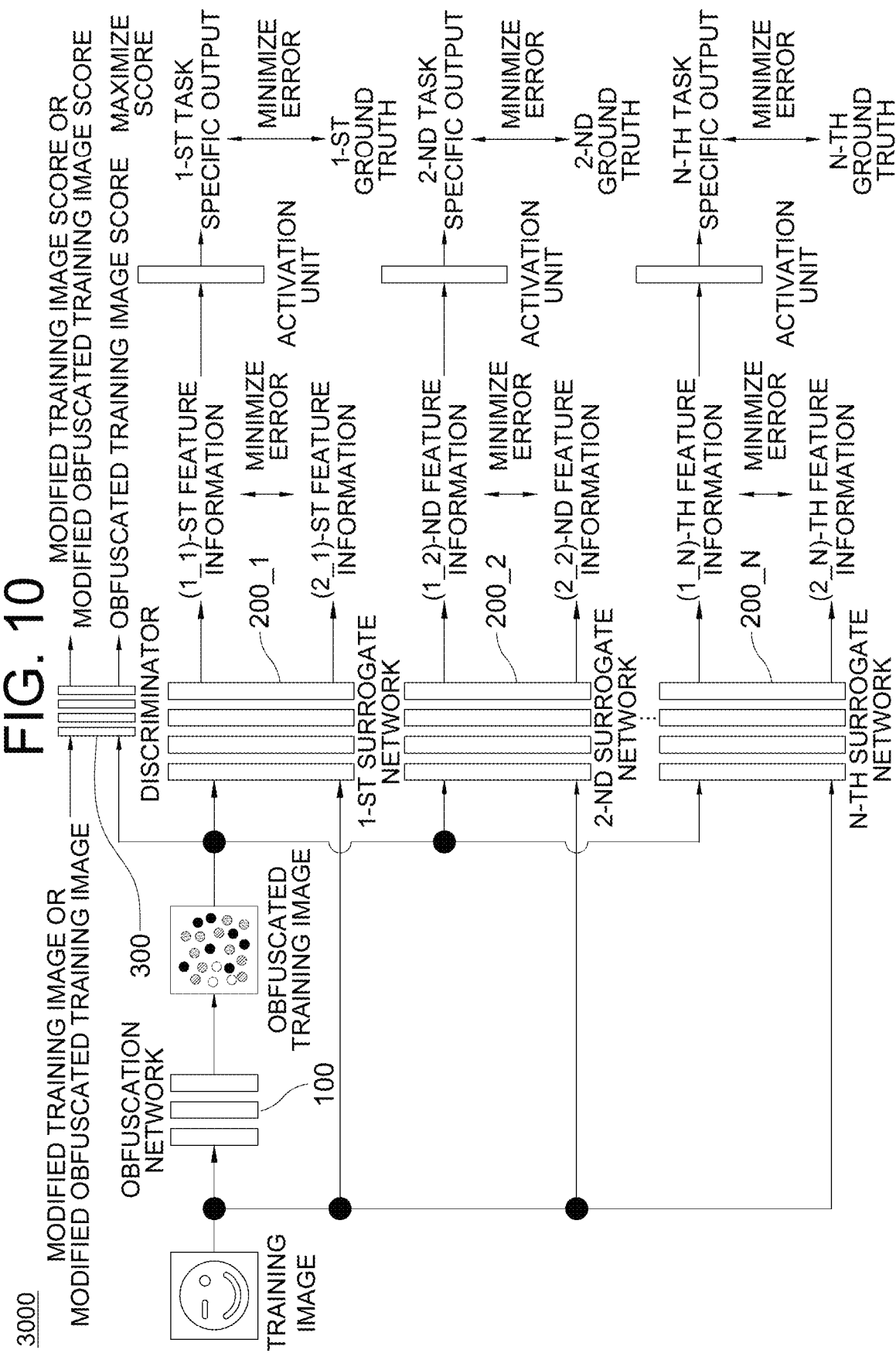
FIG. 10 is a drawing schematically illustrating a method for training the obfuscation network with another example embodiment of the present disclosure.

Meanwhile, FIG. 10 is a drawing schematically illustrating a method for training the obfuscation network capable of generating the obfuscate image from the original image in accordance with another example embodiment of the present disclosure. That is, the trained surrogate network 200 in FIG. 10 is configured as multiple trained surrogate networks 200_1, 200_2, ..., and 200_n having their own learned parameters. In the description below, parts easily deducible from the explanation of FIG. 9 will be omitted.

By referring to FIG. 10, the learning device 3000 may input the obfuscated training image into each of the 1-st trained surrogate network 200_1 to the n-th trained surrogate network 200_n to thereby allow each of the 1-st trained surrogate network 200_1 to the n-th trained surrogate network 200_n apply its corresponding learning operation to the obfuscated training data image using respectively 1-st learned parameters to n-th learned parameters of the 1-st trained surrogate network 200_1 to the n-th trained surrogate network 200_n, and thus to generate each piece of (1_1)-st feature information to (1_n)-th feature information corresponding to the obfuscated training image. Also, the learning device 3000 may input the training image into each of the 1-st trained surrogate network 200_1 to the n-th trained surrogate network 200_n to thereby allow each of the 1-st trained surrogate network 200_1 to the n-th trained surrogate network 200_n to apply its corresponding learning operation to the training image using respectively the 1-st learned parameters to the n-th learned parameters of the 1-st trained surrogate network 200_1 to the n-th trained surrogate network 200_n, and thus to generate each piece of (2_1)-st feature information to the (2_n)-th feature information corresponding to the training image.

Next, the learning device 3000 may train the obfuscation network 100 such that (i) the first error is minimized which is calculated by referring to at least part of (i-1) the (1_1)-st error which is an average over a (1_1) 1-st error to a (1_1) n-th error wherein the (1_1) 1-st error is acquired by referring to the (1_1)-st feature information and the (2_1)-st feature information and the (1_1) n-th error is acquired by referring to the (1_n)-th feature information and the (2_n)-th feature information, and (i-2) the (1_2)-nd error which is an average over a (1_2) 1-st error to a (1_2) n-th error wherein the (1_2) 1-st error is acquired by referring to at least one 1-st task specific output created by using the (1_1)-st feature information and by further referring to at least one 1-st ground truth corresponding to the 1-st task specific output, and the (1_2) n-th error is acquired by referring to at least one n-th task specific output created by using the (1_n)-th feature information and by further referring to at least one n-th ground truth corresponding to the n-th task specific output, and such that (ii) the 2-nd error is maximized which is the obfuscated training image score corresponding to the obfuscated training image inputted into the discriminator 300.

That is, the learning device 3000 may acquire the (1_1) 1-st error calculated by referring to the (1_1)-st feature information and the (2_1)-st feature information, acquire the (1_1) 2-nd error calculated by referring to the (1_2)-nd feature information and the (2_2)-nd feature information, and similarly acquire the (1_1) n-th error calculated by referring to the (1_n)-th feature information and the (2_n)-th feature information, and thus acquire the (1_1)-st error which is the average over the acquired (1_1) 1-st error to the acquired (1_1) n-th error. Then, the learning device 3000 may acquire the (1_2) 1-st error to the (1_2) n-th error where the (1_2) 1-st error is calculated by referring to the 1-st task specific output created by using the (1_1)-st feature information and the 1-st ground truth corresponding to the 1-st task specific output and the (1_2) n-th error is calculated by referring to the n-th task specific output created by using the (1_n)-th feature information and the n-th ground truth corresponding to the n-th task specific output, and thus acquire the (1_2)-nd error which is an average over the acquired (1_2) 1-st error to the (1_2) n-th error. Also, the learning device 3000 may learn the obfuscation network 100 such that the 1-st error is minimized which is calculated by referring to at least part of the (1_1)-st error and the (1_2)-nd error, and that the 2-nd error is maximized, but the present disclosure is not limited thereto.

In addition, the learning device 3000 may measure at least one quality by referring to at least part of the entropy and the degree of noise of the obfuscated training image, and may acquire the first error by further referring to the quality. That is, the learning device 3000 may train the obfuscation network 100, such that quality of the obfuscated training image is minimized, for example, such that the entropy, the noise, etc. of the obfuscated training image is maximized.

Therefore, the obfuscation network 100 may be trained by using the methods schematically illustrated in FIGS. 9 and 10 as explained above, but the present disclosure is not limited thereto. For example, various training methods including the above-mentioned methods may be found in US registered patents such as U.S. Pat. Nos. 10,635,788 B2 and 10,747,854 B2.

Meanwhile, the labeled image generated in accordance with the present disclosure may be provided or sold to a buyer of image big data.

Also, in accordance with the present disclosure, the buyer may execute program instructions recorded in computer readable media by using the computer devices, to thereby generate the labeled image from the original image owned by the buyer or acquired from other sources, and use the labeled image for his/her own neural networks.

The present disclosure has an effect of preventing the leakage of the private information included in the original image by using transformed images for the distributed labeling, wherein the transformed images are generated by dividing, transforming and obfuscating the original image.

The present disclosure has another effect of generating the labeled image corresponding to the original image without having to directly use the original image by using partial labeled images obtained from the distributed labeling, the obfuscated image generated from obfuscating the original image, and transform functions applied to the original image for generating the transformed images.

The present disclosure has still another effect of obfuscating the original image through the obfuscation network to generate the obfuscated image that is not identifiable by the naked eyes but identifiable by the neural networks, such that the labeled image generated by combining the obfuscated image with labels is not identifiable by naked eyes but usable for training the neural networks.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed:

1. A method for producing at least one labeled image from at least one original image while preventing private information leakage of the original image, comprising steps of:
(a) a labeling server performing or supporting another device to perform a process of (i) providing an image modifying interface to a user device owned by a user having at least one original image, to thereby allow the user device to (i-1) determine labeling region information through the image modifying interface, wherein the labeling region information includes a 1-st labeling region to an n-th labeling region on which labeling for the original image is to be performed, and (i-2) perform one of (i-2-a) generating a k-th anonymized image by anonymizing an entire region of the original image except a k-th labeling region as k varies from 1 to n, resulting in a generation of a 1-st anonymized image to an n-th anonymized image, and selecting a 1-st transform function to an n-th transform function thus to generate a 1-st transformed image to an n-th transformed image by applying the 1-st transform function to the n-th transform function respectively to the 1-st anonymized image to the n-th anonymized image, and (i-2-b) generating a k-th cropped image by cropping the k-th labeling region from the original image as k varies from 1 to n, resulting in a generation of a 1-st cropped image to an n-th cropped image, and selecting the 1-st transform function to the n-th transform function thus to generate the 1-st transformed image to the n-th transformed image by applying the 1-st transform function to the n-th transform function respectively to the 1-st cropped image to the n-th cropped image, and (ii) providing an obfuscating interface to the user device to thereby allow the user device to generate an obfuscation request for the original image, and then, in response to the obfuscation request, allow an obfuscation network to obfuscate the original image by performing an obfuscating operation on the original image, thus to generate an obfuscated image;
(b) the labeling server performing or supporting another device to perform a process of transmitting the 1-st transformed image to the n-th transformed image, having received from the user device, to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the labeling server; and
(c) in response to acquiring the 1-st partial labeled image to the n-th partial labeled image, the labeling server performing or supporting another device to perform a process of applying a 1-st inverse transform function to an n-th inverse transform function, respectively corresponding to the 1-st transform function to the n-th transform function received from the user device, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

2. The method of claim 1, wherein, at the step of (a), the labeling server performs or supports another device to perform a process of allowing the user device to apply at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus to generate the 1-st transformed image to the n-th transformed image.

3. The method of claim 1, wherein, at the step of (c), the labeling server performs or supports another device to perform a process of acquiring an encrypted 1-st transform function to an encrypted n-th transform function from the user device and decrypting the encrypted 1-st transform function to the encrypted n-th transform function, to thereby obtain the 1-st transform function to the n-th transform function and then generate the 1-st inverse transform function to the n-th inverse transform function corresponding to the 1-st transform function to the n-th transform function.

4. The method of claim 1, wherein, at the step of (a), the labeling server performs or supports another device to perform a process of allowing the user device to anonymize the entire region of the original image except the k-th labeling region by using at least one anonymizing algorithm, including noise addition, blurring, resolution change, and watermark addition, as k varies from 1 to n, and thus to generate the 1-st anonymized image to the n-th anonymized image.

5. The method of claim 1, wherein, at the step of (a), the labeling server performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

6. The method of claim 1, wherein the labeling server performs or supports another device to perform a process of allowing the user device to generate the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

7. The method of claim 6, wherein the obfuscation network has been trained by a learning device, and
wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

8. The method of claim 1, wherein, at the step of (c), the labeling server performs or supports another device to perform a process of transmitting the labeled image to the user device or a third party server or a third party device requiring the labeled image for training neural networks.

9. A method for producing at least one labeled image from at least one original image while preventing private information leakage of the original image, comprising steps of:
(a) in response to receiving labeling request information for at least one original image from a user device, a labeling server performing or supporting another device to perform a process of (i) (i-1) determining labeling region information by referring to the original image, wherein the labeling region information includes a 1-st labeling region to an n-th labeling region on which labeling for the original image is to be performed, and (i-2) performing one of (i-2-a) generating a k-th anonymized image by anonymizing an entire region of the original image except a k-th labeling region as k varies from 1 to n, resulting in a generation of a 1-st anonymized image to an n-th anonymized image, and applying a 1-st transform function to an n-th transform function respectively to the 1-st anonymized image to the n-th anonymized image, resulting in a generation of a 1-st transformed image to an n-th transformed image, and (i-2-b) generating a k-th cropped image by cropping the k-th labeling region from the original image as k varies from 1 to n, resulting in a generation of a 1-st cropped image to an n-th cropped image, and applying the 1-st transform function to the n-th transform function respectively to the 1-st cropped image to the n-th cropped image, resulting in the generation of the 1-st transformed image to the n-th transformed image, and (ii) inputting the original image into an obfuscation network, to thereby allow the obfuscation network to obfuscate the original image by performing an obfuscating operation on the original image, thus to generate an obfuscate image;
(b) the labeling server performing or supporting another device to perform a process of transmitting the 1-st transformed image to the n-th transformed image to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the labeling server; and
(c) in response to acquiring the 1-st partial labeled image to the n-th partial labeled image, the labeling server performing or supporting another device to perform a process of applying a 1-st inverse transform function to an n-th inverse transform function, respectively corresponding to the 1-st transform function to the n-th transform function, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

10. The method of claim 9, wherein, at the step of (a), the labeling server performs or supports another device to perform a process of applying at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus generating the 1-st transformed image to the n-th transformed image.

11. The method of claim 9, wherein, at the step of (a), the labeling server performs or supports another device to perform a process of anonymizing the entire region of the original image except the k-th labeling region by using at least one anonymizing algorithm, including noise addition, blurring, resolution change, and watermark addition, as k varies from 1 to n, and thus generating the 1-st anonymized image to the n-th anonymized image.

12. The method of claim 9, wherein, at the step of (a), the labeling server performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

13. The method of claim 9, wherein the labeling server performs or supports another device to perform a process of generating the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

14. The method of claim 13, wherein the obfuscation network has been trained by a learning device, and
wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

15. The method of claim 9, wherein, at the step of (c), the labeling server performs or supports another device to perform a process of transmitting the labeled image to the user device or a third party server or a third party device requiring the labeled image for training neural networks.

16. A labeling server for producing at least one labeled image from at least one original image while preventing private information leakage of the original image, comprising:
at least one memory that stores instructions; and
at least one processor configured to execute the instructions to perform or support another device to perform: (I) a process of (i) providing an image modifying interface to a user device owned by a user having at least one original image, to thereby allow the user device to (i-1) determine labeling region information through the image modifying interface, wherein the labeling region information includes a 1-st labeling region to an n-th labeling region on which labeling for the original image is to be performed, and (i-2) perform one of (i-2-a) generating a k-th anonymized image by anonymizing an entire region of the original image except a k-th labeling region as k varies from 1 to n, resulting in a generation of a 1-st anonymized image to an n-th anonymized image, and selecting a 1-st transform function to an n-th transform function thus to generate a 1-st transformed image to an n-th transformed image by applying the 1-st transform function to the n-th transform function respectively to the 1-st anonymized image to the n-th anonymized image, and (i-2-b) generating a k-th cropped image by cropping the k-th labeling region from the original image as k varies from 1 to n, resulting in a generation of a 1-st cropped image to an n-th cropped image, and selecting the 1-st transform function to the n-th transform function thus to generate the 1-st transformed image to the n-th transformed image by applying the 1-st transform function to the n-th transform function respectively to the 1-st cropped image to the n-th cropped image, and (ii) providing an obfuscating interface to the user device to thereby allow the user device to generate an obfuscation request for the original image, and then, in response to the obfuscation request, allow an obfuscation network to obfuscate the original image by performing an obfuscating operation on the original image, thus to generate an obfuscated image, (II) a process of transmitting the 1-st transformed image to the n-th transformed image, having received from the user device, to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the processor, and (III) in response to acquiring the 1-st partial labeled image to the n-th partial labeled image, a process of applying a 1-st inverse transform function to an n-th inverse transform function, respectively corresponding to the 1-st transform function to the n-th transform function received from the user device, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

17. The labeling server of claim 16, wherein, at the process of (I), the processor performs or supports another device to perform a process of allowing the user device to apply at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus to generate the 1-st transformed image to the n-th transformed image.

18. The labeling server of claim 16, wherein, at the process of (III), the processor performs or supports another device to perform a process of acquiring an encrypted 1-st transform function to an encrypted n-th transform function from the user device and decrypting the encrypted 1-st transform function to the encrypted n-th transform function, to thereby obtain the 1-st transform function to the n-th transform function and then generate the 1-st inverse transform function to the n-th inverse transform function corresponding to the 1-st transform function to the n-th transform function.

19. The labeling server of claim 16, wherein, at the process of (I), the processor performs or supports another device to perform a process of allowing the user device to anonymize the entire region of the original image except the k-th labeling region by using at least one anonymizing algorithm, including noise addition, blurring, resolution change, and watermark addition, as k varies from 1 to n, and thus to generate the 1-st anonymized image to the n-th anonymized image.

20. The labeling server of claim 16, wherein, at the process of (I), the processor performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

21. The labeling server of claim 16, wherein the processor performs or supports another device to perform a process of allowing the user device to generate the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

22. The labeling server of claim 21, wherein the obfuscation network has been trained by a learning device, and
wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

23. The labeling server of claim 16, wherein, at the process of (III), the processor performs or supports another device to perform a process of transmitting the labeled image to the user device or a third party server or a third party device requiring the labeled image for training neural networks.

24. A labeling server for producing at least one labeled image from at least one original image while preventing private information leakage of the original image, comprising:
at least one memory that stores instructions; and
at least one processor configured to execute the instructions to perform or support another device to perform: (I) in response to receiving labeling request information for at least one original image from a user device, a process of (i) (i-1) determining labeling region information by referring to the original image, wherein the labeling region information includes a 1-st labeling region to an n-th labeling region on which labeling for the original image is to be performed, and (i-2) performing one of (i-2-a) generating a k-th anonymized image by anonymizing an entire region of the original image except a k-th labeling region as k varies from 1 to n, resulting in a generation of a 1-st anonymized image to an n-th anonymized image, and applying a 1-st transform function to an n-th transform function respectively to the 1-st anonymized image to the n-th anonymized image, resulting in a generation of a 1-st transformed image to an n-th transformed image, and (i-2-b) generating a k-th cropped image by cropping the k-th labeling region from the original image as k varies from 1 to n, resulting in a generation of a 1-st cropped image to an n-th cropped image, and applying the 1-st transform function to the n-th transform function respectively to the 1-st cropped image to the n-th cropped image, resulting in the generation of the 1-st transformed image to the n-th transformed image, and (ii) inputting the original image into an obfuscation network, to thereby allow the obfuscation network to obfuscate the original image by performing an obfuscating operation on the original image, thus to generate an obfuscate image, (II) a process of transmitting the 1-st transformed image to the n-th transformed image to at least one labeler, to thereby allow the labeler to generate a 1-st partial labeled image to an n-th partial labeled image by respectively labeling the 1-st labeling region of the 1-st transformed image to the n-th labeling region of the n-th transformed image, and then allow the labeler to transmit the 1-st partial labeled image to the n-th partial labeled image to the processor, and (III) in response to acquiring the 1-st partial labeled image to the n-th partial labeled image, a process of applying a 1-st inverse transform function to an n-th inverse transform function, respectively corresponding to the 1-st transform function to the n-th transform function, to the 1-st partial labeled image to the n-th partial labeled image, thus generating 1-st adjusted partial labeling information to n-th adjusted partial labeling information, and then combining at least part of the 1-st adjusted partial labeling information to the n-th adjusted partial labeling information with the obfuscated image to thereby generate a labeled image corresponding to the original image.

25. The labeling server of claim 24, wherein, at the process of (I), the processor performs or supports another device to perform a process of applying at least one transformation algorithm, including shape transformation, color change, lateral inversion, position shift, size change, and angle adjustment, to the 1-st anonymized image to the n-th anonymized image or to the 1-st cropped image to the n-th cropped image by using the 1-st transform function to the n-th transform function, and thus generating the 1-st transformed image to the n-th transformed image.

26. The labeling server of claim 24, wherein, at the process of (I), the processor performs or supports another device to perform a process of anonymizing the entire region of the original image except the k-th labeling region by using at least one anonymizing algorithm, including noise addition, blurring, resolution change, and watermark addition, as k varies from 1 to n, and thus generating the 1-st anonymized image to the n-th anonymized image.

27. The labeling server of claim 24, wherein, at the process of (I), the processor performs or supports another device to perform a process of allowing the obfuscation network to input the original image into an encoder including a plurality of convolutional layers to thereby generate a feature map corresponding to the original image, and then to input the feature map into a decoder including a plurality of deconvolutional layers to thereby generate the obfuscated image corresponding to the original image.

28. The labeling server of claim 24, wherein the processor performs or supports another device to perform a process of generating the obfuscated image by using the obfuscation network, wherein the obfuscation network has been trained to generate at least one obfuscated training image by obfuscating at least one training image, and wherein the obfuscated training image is unidentifiable by naked eyes but is recognized to be the same as or similar to the training image by a trained surrogate network.

29. The labeling server of claim 28, wherein the obfuscation network has been trained by a learning device, and
wherein the learning device has performed or has supported another device to perform a process of (i) inputting the training image into the obfuscation network, to thereby allow the obfuscation network to obfuscate the training image and thus to generate the obfuscated training image, (ii) inputting the obfuscated training image and the training image into the trained surrogate network to allow the trained surrogate network to perform a learning operation respectively on the obfuscated training image and the training image and thus to generate a first feature information corresponding to the obfuscated training image and a second feature information corresponding to the training image, and (iii) (iii-1) acquiring a first error by referring to the first feature information and the second feature information or by referring to a task specific output and its corresponding ground truth, wherein the task specific output is generated by using the first feature information, and thus training the obfuscation network to minimize the first error, and (iii-2) acquiring a second error by referring to the training image and the obfuscated training image, and thus training the obfuscation network to maximize the second error.

30. The labeling server of claim 24, wherein, at the process of (III), the processor performs or supports another device to perform a process of transmitting the labeled image to the user device or a third party server or a third party device requiring the labeled image for training neural networks.

* * * * *